United States Patent

Rempala

[15] 3,675,877
[45] July 11, 1972

[54] MICROFILM TRANSPORT SYSTEM AND TRAILING LEADER

[72] Inventor: Chester S. Rempala, Chicago, Ill.

[73] Assignee: Bell & Howell Company, Chicago, Ill.

[22] Filed: March 11, 1970

[21] Appl. No.: 18,430

[52] U.S. Cl. ..........................242/209, 226/11, 226/181, 226/190, 242/186, 242/195
[51] Int. Cl. ........................G11b 15/29, G11b 15/24
[58] Field of Search..................242/206, 208, 209, 210, 192, 242/195, 186, 188; 226/188, 181, 190, 186, 11, 183, 187, 174, 176, 171, 91, 92; 352/184

[56] References Cited

UNITED STATES PATENTS

| 3,539,084 | 11/1970 | Bradshaw | 226/11 |
| 3,190,575 | 6/1965 | Hayner et al. | 242/195 |
| 1,997,409 | 4/1935 | May | 352/184 X |
| 2,661,164 | 12/1953 | Badmaieff | 242/188 |
| 3,470,801 | 10/1969 | Lieser et al. | 242/208 |
| 3,292,444 | 12/1966 | Bentley | 226/181 X |
| 3,399,816 | 9/1968 | Staklinski | 226/190 X |
| 1,437,843 | 12/1922 | Heinrichs | 226/186 uX |

FOREIGN PATENTS OR APPLICATIONS

| 138,606 | 2/1903 | Germany | 226/92 |

*Primary Examiner*—George F. Mautz
*Attorney*—Jack H. Hall

[57] ABSTRACT

A microfilm trailing leader and transport system for terminating the driving relationship between the film and said system to thereby eliminate excessive strain on the connection between the trailing leader and the spool hub. The invention is also directed to a novel drive capstan which eliminates the frictional engagement between the capstan and the film information bearing area to thereby increase the useful film life.

5 Claims, 5 Drawing Figures

Inventor:
Chester S. Rempala
By Jack H. Hall Atty.

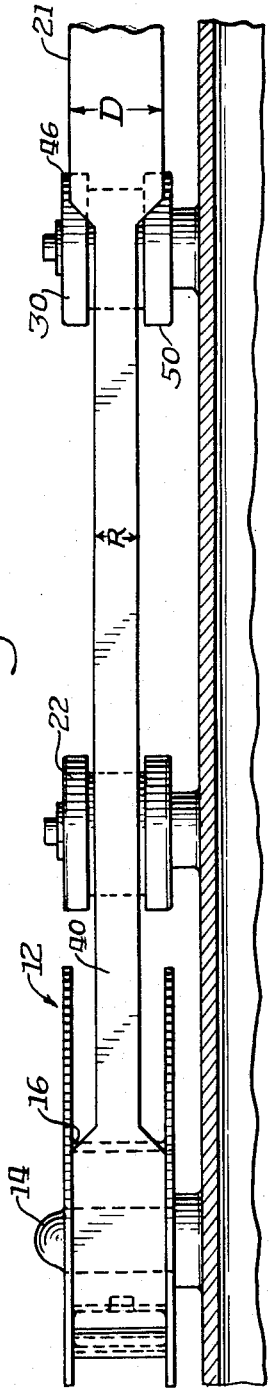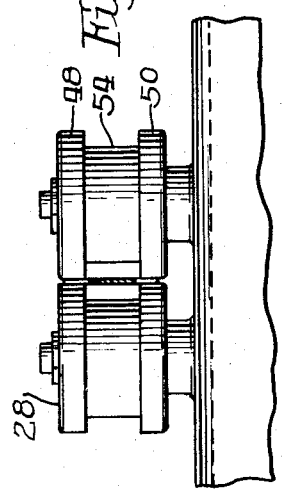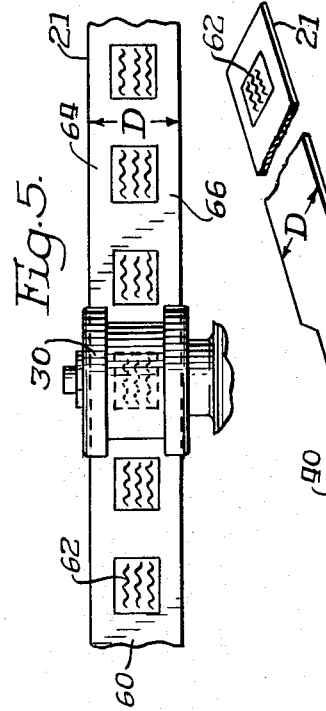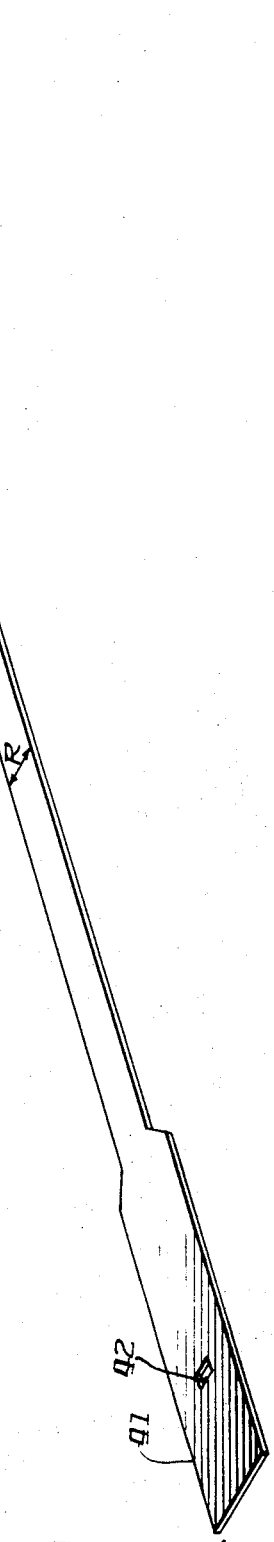

3,675,877

MICROFILM TRANSPORT SYSTEM AND TRAILING LEADER

FIELD OF THE INVENTION

This invention relates in general to web construction and complimentary web transport systems. In particular, this invention relates to web constructions for transporting film webs without excessively abrading the information bearing surface and for terminating the driving relationship between the web and a web transport system. More particularly, this invention is directed to a microfilm drive system which drivingly engages the microfilm only at its non-image bearing areas, and to a film extension strip secured to the film supply spool which cooperates with the drive system to prevent imposing inordinant strain on the film web at its connection to the spool.

DESCRIPTION OF THE PRIOR ART

Well designed microfilm reading apparatus includes a film transport system having the capability of transporting the microfilm from the supply spool on which it is coiled, to the takeup spool, at any desired rate of speed from a very slow speed for scanning the image information to a very high speed for rapidly moving the film to a particular location whereat the information an operator is seeking is known to be positioned. The ability to rapidly transport the film to the takeup spool is particularly desirable when the information an operator is seeking is known to be located adjacent the far end of the film web.

Upon transporting the film at high speeds, a large rotational moment of inertia is created in the mass of the takeup spool and the microfilm coiled thereon. This moment of inertia, along with the additional stress imposed upon the film by the film drive system has heretofore presented a vexatious problem of severing or tearing the trailing end of the film at or adjacent its point of attachment to the spool hub. The trailing end thus had to be re-attached to the spool hub prior to re-winding it with a resultant time loss on the part of the operator and loss of a segment of the microfilm.

Typical microfilm webs include a central image bearing film portion containing the micro-image information and adjacent non-image bearing film portions located inwardly of the film edges but outwardly of the central portion.

Microfilm transport systems commonly employed in transporting microfilm include one or more driven capstans which engage the entire widthwise dimension of the film web. In so engaging the film the capstans rub directly on the central image bearing portion causing undesirable abrasion of the image information which seriously reduces the microfilm life. Film abrasion increases as a function of the increase in relative movement between the film and the capstan peripheral surface.

SUMMARY OF THE INVENTION

This invention obviates the above-mentioned problems and difficulties previously incurred in transporting microfilm at a high rate of speed from a supply spool by providing driven transport capstans of non-uniform surface diameter which are dimensioned so as to eliminate all driving connection with an extension strip or trailing leader at the end of the microfilm web. The surface configuration of the capstans also limits contact thereof to the non-image bearing portions of the film which eliminates abrasion of the central, image-bearing portion.

In accordance with the invention, a trailing leader having a reduced widthwise dimension is formed integral with, or it may be secured in some manner to the end of a microfilm web. The driven film transport capstans each have an irregularly shaped drive surface comprising spaced apart upper and lower flanges of equal diameter and a reduced diameter central capstan portion forming a shallow groove between the flanges. Each capstan thus has the general appearance of a sewing thread spool.

The flange portions of the capstans are spaced apart a distance slightly less than the width of the microfilm web and they transport the film web by frictionally engaging the film surfaces inwardly adjacent the edge extremities. However, the reduced width portion of the trailing leader is of insufficient width to be engaged by the capstan flanges but rather is accommodated in the central groove. Thus, all frictional driving connection between the capstans and the film web is eliminated.

The relatively large diameter flange construction of the capstans limits engagement to only the outer, non-film bearing portions of the film while the capstan groove neither rubs or engages the central image bearing portion thereby totally eliminating abrasion of the image bearing surface.

Accordingly, the primary object of this invention is to provide means for eliminating driving engagement between a microfilm web and associated web engaging capstans along a given section of the film web.

Another object of this invention is to provide, in a web transport system wherein one end of the web is secured to a supply spool, means for inhibiting tearing of the secured end from the spool hub.

An additional object of this invention is to provide means for terminating the driving relationship between a driven film capstan and a portion of a microfilm web.

A further object of this invention is to provide, for use with a microfilm web, a trailing leader having a reduced widthwise dimension.

It is also an object of this invention to provide means for transporting a microfilm web having an image bearing central portion by frictionally engaging only the face surface of the web outwardly of the central portion thereby eliminating abrasion of the image bearing surface.

Additional objects of this invention will become apparent to those versed in the art upon understanding of the following detailed description of the trailing leader and capstan construction of the invention taken in conjunction with the accompanying drawings in which the preferred embodiment of the invention is shown, and wherein:

FIG. 2 is an enlarged, elevational cross-sectional view taken along section line 2—2 of FIG. 1 showing a pair of cooperating film transport capstans and the trailing leader of the invention;

FIG. 3 is an elevational view to the same scale as FIG. 2 taken along offset section line 3—3 of FIG. 1 showing the position of the trailing leader relative to two drive capstans, during a given phase of operation;

FIG. 4 is an enlarged perspective view of a portion of the trailing leader of the invention;

FIG. 5 is an elevational view of a capstan of the invention and its relationship to a portion of the film web, particularly illustrating the contact therebetween.

Figure 1:
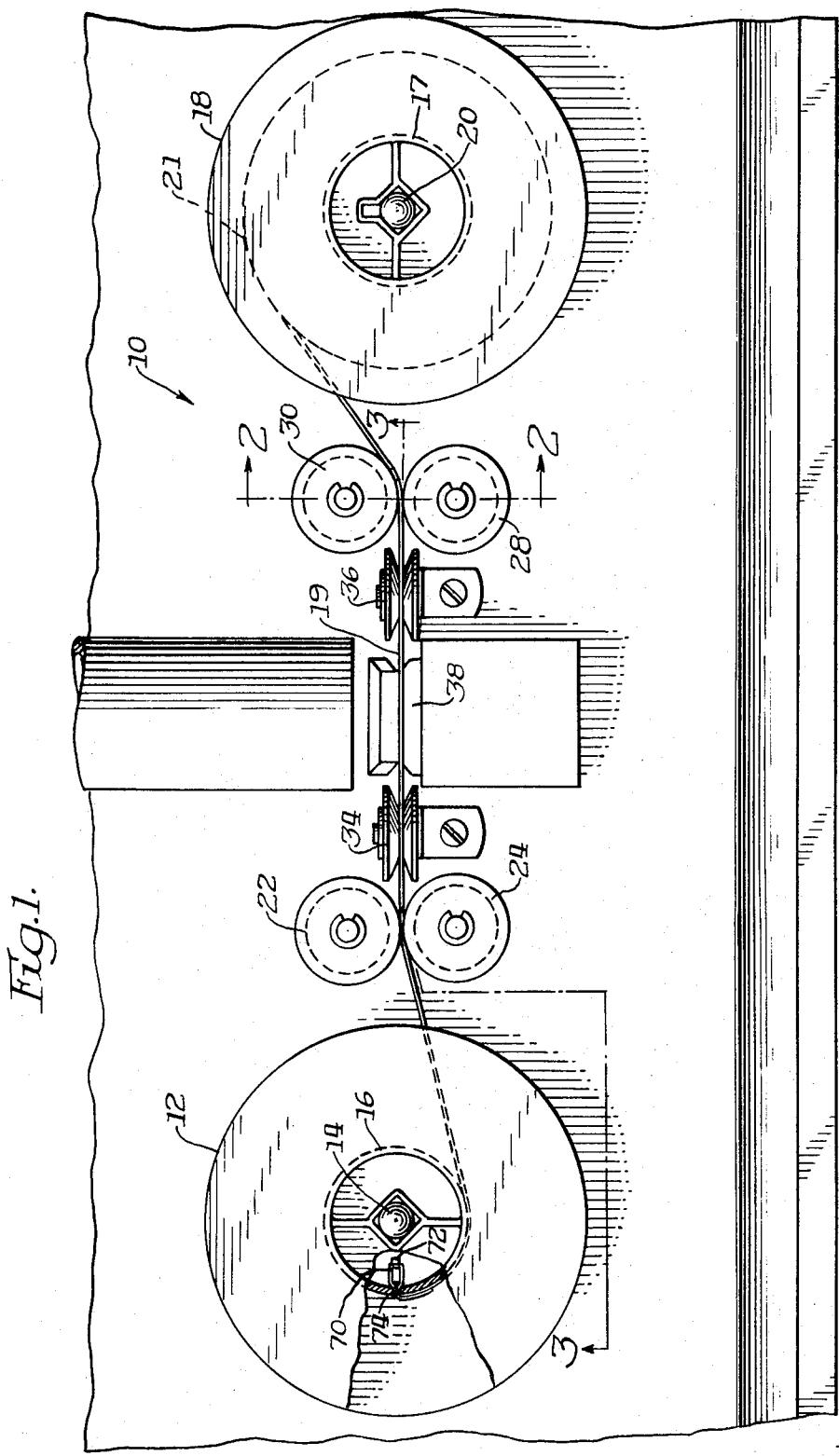
FIG. 1 is a top plan view of an exemplary film transport system of a microfilm reader.

Referring now to FIG. 1 of the drawings, a microfilm transport system, generally referred to by reference numeral 10, is seen to include a film supply spool 12 rotatably carried on a left supply spindle 14, a film takeup spool 18 rotatably carried on a right spindle 20, and a film path 19 defined therebetween for accommodating a microfilm web 21. The supply spindle includes a hub 16 having the end of a trailing leader secured thereto as will be described in detail below. Spindles 14 and 20 are each driven in appropriate directions, depending upon the direction in which it is desired to transport the web, by a motor and suitable drive coupling, not shown. The particular spool serving as the take-up spool is driven through a slip clutch at a rate of speed slightly higher than that of the film through the path to thereby maintain constant film tension.

The film transport apparatus further includes a pair of nip forming film drive capstans 22 and 24 adjacent the supply spool and a like pair of nip forming drive capstans 28 and 30 adjacent the takeup spool. Capstans 22, 28 and 30 are rotatably driven by a motor and suitable clutches, not shown, for transporting the microfilm in either direction, as desired.

Film capstan 24 is rotated by its frictional engagement with film 21 and is connected to a suitable counter for identifying the distance of film travel thereby keying the image information and facilitating its location along the film length.

A pair of film guides 34 and 36 are provided between the capstan pairs for guiding the film through a film gate 38. Light from a suitable source is reflected to the gate and passed through the microfilm for displaying image information on a suitable display screen not shown, in a manner well known in the art.

Turning now to FIGS. 2, 3 and 4, the microfilm is seen to have a widthwise dimension "D" which is substantially uniform along the entire film length. In accordance with the invention, a trailing leader or strip 40 having a reduced widthwise dimension "R" forms an extension of the trailing end of film web 21. The trailing leader may be fastened to the end of the film web in any suitable manner, such as by an adhesive or a mechanical fastener, or, as shown in the illustrated embodiment it may be formed integral with the film end. The terminal or loose end 41 of trailing leader 40 is provided with a square opening 42 for securing it to the spool hub.

As illustrated in FIGS. 2 and 3, each of the driven capstans is identically shaped therefore, to facilitate this description only the construction of capstan 30 will be described.

Capstan 30 includes a pair of equal diameter spaced apart upper and lower flanges 48 and 50 and an undercut central capstan portion of lesser diameter which defines a circular groove 54. The distance between the opposing faces or sides of the upper and lower flanges which define groove 54, is slightly greater than the width "R" of the trailing leader. However, the groove height is less than the width "D" of the film web. For example, for microfilm having a width "D" of 0.630 inches, and a trailing leader having a width "R" of 0.31, capstans having a groove height of 0.375 inches and flange heights of 0.1875 inches may be used.

Thus, as clearly illustrated in FIGS. 2 and 3, flanges 48 and 50 only cooperate with the surfaces of the film inwardly adjacent the film web edges to transport the film along the path. However, when the end of the film is reached, the trailing leader is received in the capstan grooves which terminates the driving relationship thus, no strain is transmitted to the film web or its connection to the hub.

Referring now specifically to FIG. 5, film web 21 is seen to include a central image bearing area 60 containing a series of micro-images 62. Web 21 also includes a non-image bearing area 64 comprising the border above central area 60, and a second non-image bearing area 66 comprising the border below the central area.

In accordance with a second aspect of the invention, the spaced apart flanges 48 and 50 contact only the non-image bearing border areas 64 and 66 of the film web. Thus, the capstan surfaces never contact the central image bearing area which substantially eliminates abrasion of the image information and greatly increases its useful life.

In the illustrated embodiment, terminal end 41 of the trailing leader is secured to supply spool hub 16 by a rectangular pin 70 having a small projection 72 and having a length approximately equal to the width of end 41. End 41 is secured to the hub by forming a small loop with opening 42 positioned at the loop apex and inserting the pin 70 interiorly of the loop with projection 72 extending into and through opening 42. The two layers of film at the open end of the loop are now pressed together and passed downwardly through a slot 74 provided in the hub wall. Pin 70 thus forms a restriction which is unable to pass through slot 74 thereby securing the film to the hub. Should it be desirable to remove the film from the hub, the loop may be lifted upwardly through the slot.

What has been described is a novel trailing leader for use with a microfilm strip or other web structure and film capstan means which cooperate in an economical and reliable manner to terminate the driving relationship between film capstan means and the trailing leader to thereby prevent imposing inordinate stress upon the film end. The invention also includes a novel capstan construction which cooperates with the film to eliminate abrasion of the image bearing surface.

It is obvious that upon study by those skilled in the art the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

1. For use with a web of generally uniform width and substantial length which may be transported lengthwise along a path; a short strip of web-like material having a reduced widthwise dimension forming an extension of said web and with the centerline of said width strip being substantially aligned with the centerline of said web, and a rotatably driven capstan disposed adjacent said film path having a circular flange portion engaging the face surface of said web along an area inwardly adjacent to the web edge for imparting movement thereto and having a circular undercut portion for accommodating said strip without imparting driving movement.

2. In combination: a microfilm web displaying a generally uniform first cross-section of given widthwise dimension along its length as viewed perpendicular thereto and displaying a second cross-section of reduced widthwise dimension at one end of said film web, said microfilm web having an image bearing central portion along its length and spaced apart non-image bearing portions outwardly thereof, and a microfilm transport system including a driven capstan having an active film driving surface defined by a pair of spaced apart capstan flanges of greater diameter than the surface of the capstan therebetween for drivingly engaging only the non-image bearing portions of said film.

3. In combination: a microfilm web having an image bearing central portion along its length and non-image bearing film portions outwardly adjacent each edge of said image bearing portion, a microfilm transport system including powered capstan means having a pair of spaced apart flanges of substantially equal diameter which drivingly engage only said non-image bearing film portions, a film supply spool for carrying said film web in coiled relation thereon, and a film extension strip at the inner end of said microfilm having a widthwise dimension less than the widthwise dimension of said microfilm and secured to the supply spool, said capstan means having an undercut central surface disposed between said flanges which accommodates said extension strip when substantially all of said film has been removed from the supply spool to terminate the driving relation between the film and capstan means.

4. The combination as set forth in claim 3 wherein the centerline of said extension strip is substantially aligned with the centerline of said microfilm web.

5. A device for use with a web of generally uniform width and substantial length which may be transported lengthwise along a path, comprising: a short strip of web-like material having a reduced widthwise dimension forming an extension of said web, transport means having a first portion engaging only a portion of the web face surface inwardly adjacent its edges to establish a first operational condition with said web for moving said strip along said path and a second recessed portion which operatively disengages from said strip to establish a second operational condition imparting no transport movement to said strip.

* * * * *